United States Patent [19]

Yoshinada et al.

[11] Patent Number: 4,531,082
[45] Date of Patent: Jul. 23, 1985

[54] CONTROL SYSTEM FOR POSITIONING IMPLEMENTS

[75] Inventors: Hiroshi Yoshinada, Machida; Hiroshi Oshima, Yokohama; Takashi Ono, Chigasaki, all of Japan

[73] Assignee: Kabushiki Kaisha Komatsu Seisakusho, Tokyo, Japan

[21] Appl. No.: 523,753

[22] Filed: Aug. 16, 1983

[51] Int. Cl.³ .............................................. G05B 1/06
[52] U.S. Cl. .................................... 318/663; 180/142
[58] Field of Search ....................... 318/663, 564, 568; 180/142, 628

[56] References Cited

U.S. PATENT DOCUMENTS

| | | | |
|---|---|---|---|
| 3,462,660 | 8/1969 | Barltrop | 318/564 |
| 3,905,728 | 9/1975 | Swedberg | |
| 3,953,158 | 4/1976 | Uppal | |
| 4,011,493 | 3/1977 | Fukase et al. | 318/568 |
| 4,037,519 | 7/1977 | Miller et al. | 318/663 X |
| 4,191,913 | 3/1980 | Arnold et al. | 318/663 X |

Primary Examiner—B. Dobeck
Attorney, Agent, or Firm—Frost & Jacobs

[57] ABSTRACT

A control system for positioning an implement using a power steering unit. Instead of connecting a rotary spool of the power steering unit with a steering wheel, the rotary spool is connected with a DC motor through reduction gears. An angular displacement of a control lever is detected by an angular position detector and an angular displacement of an implement is detected by another angular position detector. Signals from both detectors are fed into a comparator which is connected with an amplifier for rotating the DC motor in either direction in response to signals therefrom.

1 Claim, 5 Drawing Figures

CONTROL SYSTEM FOR POSITIONING IMPLEMENTS

BACKGROUND OF THE INVENTION

This invention relates to a control system for positioning implements of construction vehicles and implements such as manipulators etc.

In the conventional electric-hydraulic servo systems serving as a positioning device of the kind specified, electric-hydraulic servo valves are generally employed for conducting electric-hydraulic conversion. The electric-hydraulic servo valves are however expensive in cost and are liable to cause troubles when dust etc. enters them and when they undergo vibration, and therefore their applications are restricted.

SUMMARY OF THE INVENTION

It is therefore an object of the present invention to provide a control system for positioning an implement which is simple in construction and inexpensive to manufacture.

Another object of the present invention is to provide a control system for positioning an implement which is reliable in operation and can be used in various environmental conditions.

In accordance with an aspect of the present invention, there is provided a control system for positioning an implement, comprising: a source of pressurized fluid; a power steering unit including a rotary valve having a sleeve and a rotary spool rotatably received in the sleeve and metering means operatively associated with the rotary valve for metering pressurized fluid from said source in response to an annular displacement of the rotary spool relative to the sleeve; an implement pivotally mounted on a body; cylinder means connected with said power steering unit for angularly displacing said implement; first angular position detector means for detecting an angular displacement of said implement relative to said body; an operating lever means pivotally mounted on said body for operating said implement; second angular position detector means for detecting an angular displacement of said operating lever means relative to said body; comparator means connected with said first and second angular position detector means for comparing signals therefrom and generating an output signal; amplifier means for receiving the output signal from said comparator means and generating an output signal therefrom; and DC motor means connected with said amplifier means and said rotary spool of said rotary valve for rotating said rotary spool in response to the output signal from said amplifier means.

The above and other objects, features and advantages of the present invention will be readily apparent from the following description taken in conjunction with the accompanying drawings.

DESCRIPTION OF THE PREFERRED EMBODIMENT

The present invention will now be described by way of example only with reference to the accompanying drawings.

Figure 1:
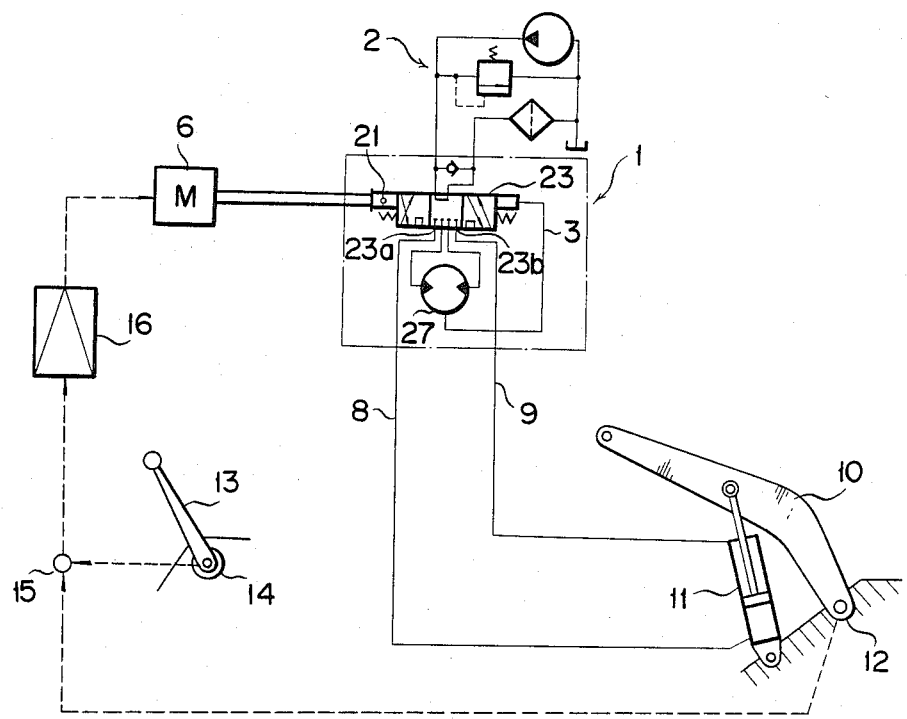
FIG. 1 is a diagramatic representation of an implement positioning system according to the present invention.

In FIG. 1, reference numeral 1 denotes a power steering unit which is used in the steering system of vehicles having large-sized wheels and which is an application of servo machanism wherein a mechanical displacement obtained by the manipulation of steering wheel is converted in a displacement by fluid pressure exerted through a hydraulic cylinder. Steering units of this type require limited number of component parts and are low in manufacturing cost with a high reliability. Further, they are characterized in that rotary valves thereof can be turned continuously without limitation in angle of rotation at a low input torque.

The power steering unit 1 comprises a power system portion 2, a direct mechanical link 3, and a metering means 27 having a gerotor.

Figure 2:
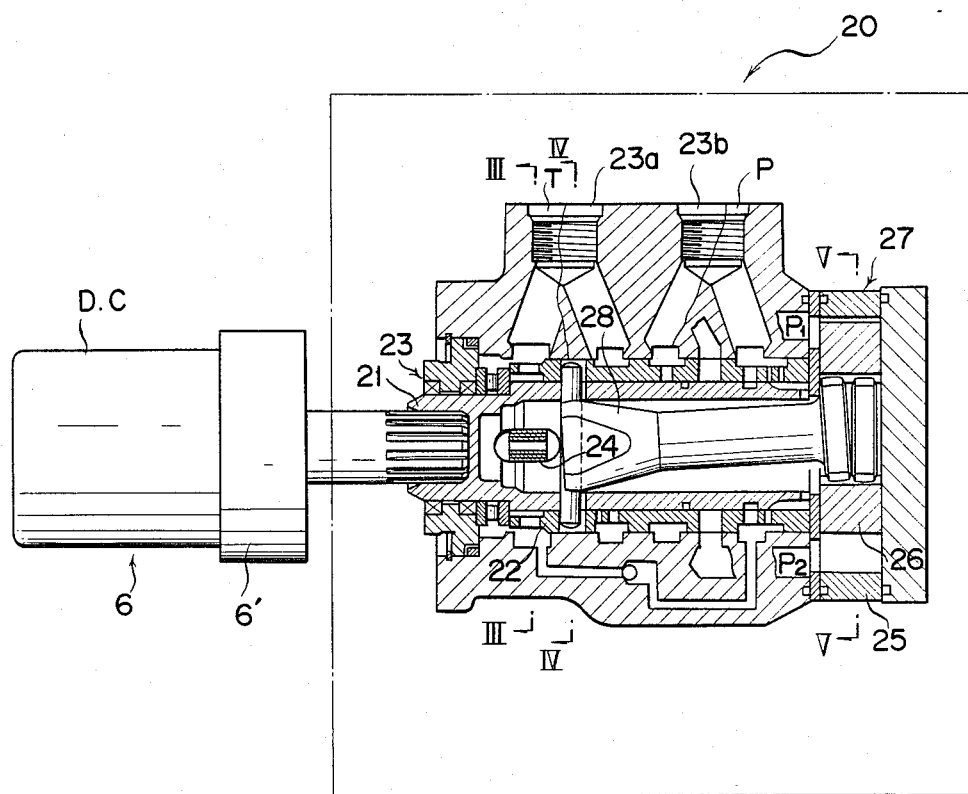
FIG. 2 is a sectional view of a power steering unit employed in the system of FIG. 1.

The construction of the steering unit 1 is shown in FIG. 2, in which reference numeral 20 denotes a unit marketed as an element of steering system for wheeled vehicles.

The operating principle of the steering unit 1 will now be described below.

A spool 21 which is an input shaft of the steering unit 1 (and is usually coupled with a steering wheel) and a sleeve 22 form a rotary valve 23. The arrangement is made such that the spool 21 is turned to cause an angular displacement between the spool 21 and the sleeve 22 to thereby conduct change-over of oil passages.

Figure 3:
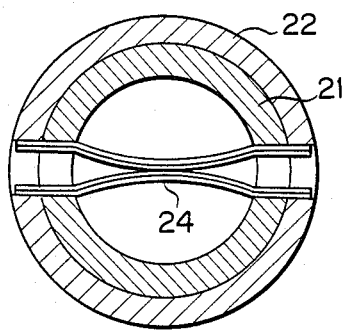
FIG. 3 is a sectional view taken along the line III—III of FIG. 2.
Figure 5:
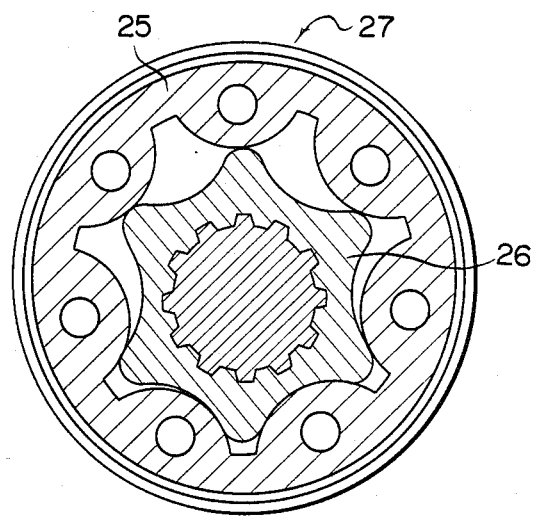
FIG. 5 is a sectional view taken along the line V—V of FIG. 2.

Further, when no external force is applied to the spool 21, the rotary valve 23 is held at its neutral position by the action of a centering spring 24 inserted between the spool 21 and the sleeve 22. (Refer to FIG. 3). The fluid pressure delivered by a hydraulic pump is supplied from an inlet port P and through the rotary valve 23 and thence into a front chamber $P_1$ or $P_2$ of a metering device 27 comprising a gerotor ring 25 and a gerotor star 26. (Refer to FIG. 5). The metering device 27 is a kind of inscribed gears employing, for example, as shown in FIG. 5, trochoid curves for their teeth shapes and which is constituted by the gerotor ring 25 (stator) having seven gear teeth and the gerotor star 26 (rotor) having six gear teeth and has a metering function to discharge fluid under pressure in volume in proportion to the displacement of the spool 21 of the rotary valve.

Figure 4:
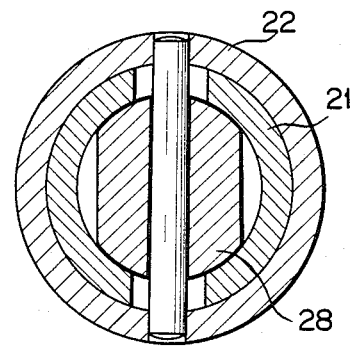
FIG. 4 is a sectional view taken along the line IV—IV of FIG. 2.

Further, the gerotor star 26 is mechanically connected through a drive shaft 28 to the sleeve 22 to provide a feed back effect (Refer to FIG. 4). This drive shaft 28 corresponds to the mechanical link 3 in FIG. 1. An output shaft of a motor 6 (DC motor) is connected to the spool 21 of the rotary valve 23. The rotary valve 23 has ports 23a and 23b and which ports are connected through conduits 8 and 9, respectively, to an operating cylinder 11 of an implement 10. An angular position detector 12 is located at the fulcrum of the implement 10.

In FIG. 1, reference numeral 13 denotes an operating lever which has an angular position detector 14 fitted at its fulcrum of turning. The output sides of these angular position detectors 12 and 14 are both connected to the input side of a comparator 15, the output side of which is connected to the input side of a servo amplifier 16, the output side of which is connected to the input side of the motor 6, thus forming a closed loop control system.

The operation of the control system according to the present invention will now be described below.

If and when the control lever 13 is moved to a certain position in a direction for raising the implement, the angular position detector 14 will detect the movement and generate a command signal corresponding to the position of the lever 13 which is sent into the servo amplifier 16 to thereby drive the motor 6 in a predetermined direction. As a result, the rotary valve 23 of the power steering unit 1 will be driven so as to allow the fluid under pressure from the power system 2 to be supplied into the hydraulic cylinder 11 thereby raising the implement 10. When the implement 10 has reached a target position, the deviation in signal between the angular position detector 12 of the implement 10 and the angular position detector 14 of the control lever 13 becomes zero so that the rotation of the motor 6 is stopped, the steering unit 1 is moved to its neutral position and the implement 10 is held at the target position. The same operating principle is applicable to the case of lowering the implement 10. The power steering unit is constructionally disadvantageous in that the actuator connected thereto tends to cause the neutral position to get out of place unless it can supply equal amount of fluid under pressure to either of leftward or rightward movement like, for example, hydraulic motors and double-rod hydraulic cylinders. However, in the system shown in FIG. 1, there is provided a feed back circuit which detects the position of the actuator, for example, the operating cylinder itself, there is no risk of the neutral position getting out of place even if a single-rod hydraulic cylinder is employed. In this case, however, the moving speeds of the implement when it is raised and lowered differ from each other.

If a signal from a microcomputer, a function generator or any other controller is sent to the servo amplifier 16 instead of the signal from the angular position detector 14 of the control lever 13, it is possible to move the implement as desired. Therefore, the present invention is applicable to automatically actuated machines such as industrial robots etc.

It is to be understood that the foregoing description is merely illustrative of a preferred embodiment of the present invention, and that the present invention is not to be limited thereto, but is to be determined by the scope of the appended claims.

What is claimed is:

1. A control system for positioning an implement, comprising:

a source of pressurized fluid;

a power steering unit including a rotary valve having a sleeve and a rotary spool rotatably received in the sleeve and metering means operatively associated with the rotary valve for metering pressurized fluid from said source in response to an angular displacement of the rotary spool relative to the sleeve;

an implement pivotally mounted on a body;

cylinder means connected with said power steering unit for angularly displacing said implement;

first angular position detector means for detecting an angular displacement of said implement relative to said body;

an operating lever means pivotally mounted on said body for operating said implement;

second angular position detector means for detecting an angular displacement of said operating lever means relative to said body;

a feed back circuit detecting the position of an actuator whereby to avoid displacement of a neutral position of said rotary valve;

comparator means connected with said first and second angular position detector means for comparing signals therefrom and generating an output signal;

amplifier means for receiving the output signal from said comparator means and generating an output signal therefrom;

DC motor means connected with said amplifier means and said rotary spool of said rotary valve for rotating said rotary spool in response to the output signal from said amplifier means; and gear reduction means disposed between said DC motor means and said rotary spool.

* * * * *